United States Patent
Sun et al.

(10) Patent No.: US 12,536,125 B2
(45) Date of Patent: Jan. 27, 2026

(54) DYNAMIC HOT BACKUP METHOD, APPARATUS, AND DEVICE OF SERVER, AND STORAGE MEDIUM

(71) Applicant: IEIT SYSTEMS CO., LTD., Shandong (CN)

(72) Inventors: Xiuqiang Sun, Jinan (CN); Jiaming Huang, Jinan (CN); Binghui Zhang, Jinan (CN); Peiyu Liu, Jinan (CN)

(73) Assignee: IEIT SYSTEMS CO., LTD., Shandong (CN)

( * ) Notice: Subject to any disclaimer, the term of this patent is extended or adjusted under 35 U.S.C. 154(b) by 18 days.

(21) Appl. No.: 18/697,070

(22) PCT Filed: Jun. 30, 2022

(86) PCT No.: PCT/CN2022/102602
§ 371 (c)(1),
(2) Date: Mar. 29, 2024

(87) PCT Pub. No.: WO2023/155363
PCT Pub. Date: Aug. 24, 2023

(65) Prior Publication Data
US 2025/0004975 A1    Jan. 2, 2025

(30) Foreign Application Priority Data
Feb. 17, 2022 (CN) .......................... 202210144068.1

(51) Int. Cl.
*G06F 13/42* (2006.01)

(52) U.S. Cl.
CPC .. *G06F 13/4221* (2013.01); *G06F 2213/0026* (2013.01)

(58) Field of Classification Search
None
See application file for complete search history.

(56) References Cited

U.S. PATENT DOCUMENTS 10,128,892 B1 * 11/2018 Moghaddas ............. H04B 1/40
11,016,923 B1 *  5/2021 Bolen .................... G06F 3/061
(Continued)

FOREIGN PATENT DOCUMENTS

CN    1707463 A    12/2005
CN    2919707 Y     7/2007
(Continued)

OTHER PUBLICATIONS

ARM architechture, Sep. 2021, p. 1-13 (Year: 2021).*
(Continued)

*Primary Examiner* — Henry Tsai
*Assistant Examiner* — Dean Phan
(74) *Attorney, Agent, or Firm* — Cooper Legal Group, LLC

(57) ABSTRACT

A dynamic hot backup method, apparatus and device of a server, and a storage medium. Connection modes for connecting a Peripheral Component Interconnect (PCI) link to a hard disk drive is determined by acquiring a bandwidth splitting condition of the PCI link of a device, and hot backup parameters in an advanced configuration and power management interface protocol are correspondingly set according to the connection modes.

18 Claims, 3 Drawing Sheets

S101 — Acquire a bandwidth splitting condition of a PCI link of a device

S102 — Determine, according to the bandwidth splitting condition of the PCI link, a connection mode for connecting the PCI link to a hard disk drive S103 — Correspondingly set hot backup parameters in an advanced configuration and power management interface protocol according to the connection mode

(56) References Cited

U.S. PATENT DOCUMENTS

| | | | | |
|---|---|---|---|---|
| 2004/0162975 | A1* | 8/2004 | Yakovlev | G06F 9/4411 |
| | | | | 713/1 |
| 2008/0222406 | A1* | 9/2008 | Tabuchi | G06F 9/44505 |
| | | | | 713/1 |
| 2008/0244147 | A1* | 10/2008 | Chen | G06F 13/4081 |
| | | | | 710/313 |
| 2020/0076693 | A1* | 3/2020 | Gopalarathnam | H04L 41/0886 |
| 2020/0394303 | A1 | 12/2020 | Suryanarayana et al. | |

FOREIGN PATENT DOCUMENTS

| | | |
|---|---|---|
| CN | 101432706 A | 5/2009 |
| CN | 101882126 A | 11/2010 |
| CN | 107145430 A | 9/2017 |
| CN | 108647169 A | 10/2018 |
| CN | 110532212 A | 12/2019 |
| CN | 110633131 A | 12/2019 |
| CN | 210006040 U | 1/2020 |
| CN | 111858197 A | 10/2020 |
| CN | 112015477 A | 12/2020 |
| CN | 112181505 A | 1/2021 |
| CN | 112445738 A | 3/2021 |
| CN | 112559425 A | 3/2021 |
| CN | 113448903 A | 9/2021 |
| CN | 113986796 A | 1/2022 |
| CN | 114185720 A | 3/2022 |

OTHER PUBLICATIONS

Corresponding International Patent Application No. PCT/CN2022/102602, International Search Report, Date Mailed Oct. 26, 2022.
Corresponding International Patent Application No. PCT/CN2022/102602, Written Opinion, Date Mailed Oct. 26, 2022.
Corresponding Chinese Patent Application No. CN202210144068.1, First Office Action, dated Mar. 31, 2022.
Corresponding Chinese Patent Application No. CN202210144068.1, Notification to Grant, dated Apr. 15, 2022.
Martinez, Raul, et al., "Framework to provide quality service over advanced switching", EEE Transactions on Parallel and Distributed Systems, Jun. 27, 2018, pp. 1111-1123, vol. 19, Issue 8.
Kai Shi, "Research and Design of Scalable Networked Multi-Follower PCI Express Swtich", China Master's Theses Full-text Database—Information Technology, No. 1, Jan. 15, 2019, pp. 137-245 with English abstract.

* cited by examiner

DYNAMIC HOT BACKUP METHOD, APPARATUS, AND DEVICE OF SERVER, AND STORAGE MEDIUM

CROSS-REFERENCE TO RELATED APPLICATION

This application is the national phase application of International Application No. PCT/CN2022/102602, filed Jun. 30, 2022, which claims priority to Chinese Patent Application No. 202210144068.1, entitled "DYNAMIC HOT BACKUP METHOD, APPARATUS, AND DEVICE OF SERVER, AND STORAGE MEDIUM", filed with the China National Intellectual Property Administration on Feb. 17, 2022. The contents of International Application No. PCT/CN2022/102602 and Chinese Patent Application No. 202210144068.1 are incorporated herein by reference in their entireties.

FIELD

The present application relates to the technical field of servers, and in particular, to a dynamic hot backup method, apparatus, and device of a server, and a storage medium.

BACKGROUND

A hot backup function refers to a hot swapping function of a Non-Volatile Memory express (NVMe) hard disk drive. When the NVMe hard disk drive is connected to a Peripheral Component Interconnect (PCI) link of a server using different connection modes, such as direct connection or through switching devices (a switch chip), it has different requirements for setting values of specifications of an Advanced Configuration and Power Management Interface (ACPI) protocol of a Basic Input Output System (BIOS) of the server.

The inventor realized that the hot backup function of the server was configured at the factory of the device and might not be replaced. If the PCI link of the server is set to support a hot backup function for direct connection to the NVMe hard disk drive, the PCI link might not support a hot backup function of connecting the PCI link through the switching device, and vice versa. In a BIOS mirror image, each PCI link of the server might only support the same kind of hot backup function.

How to switch the hot backup function of the server according to a user and achieve dynamic hot backup of the server is a technical problem that a person skilled in the art needs to solve.

SUMMARY

According to various embodiments disclosed in the present application, a dynamic hot backup method, apparatus, and device of a server, and a storage medium are provided.

A dynamic hot backup method of a server includes: acquiring a bandwidth splitting condition of a Peripheral Component Interconnect (PCI) link of a device; determining a connection mode for connecting the PCI link to a hard disk drive according to the bandwidth splitting condition of the PCI link; and correspondingly setting hot backup parameters in an advanced configuration and power management interface protocol according to the connection mode.

A dynamic hot backup apparatus of a server includes: an acquisition unit, configured for acquiring a bandwidth splitting condition of a PCI link of a device; a determining unit, configured for determining a connection mode for connecting the PCI link to a hard disk drive according to the bandwidth splitting condition of the PCI link; and a setting unit, configured for correspondingly setting hot backup parameters in an advanced configuration and power management interface protocol according to the connection mode.

A dynamic hot backup device of a server includes: a memory, configured for storing computer-readable instructions; and a processor, configured for executing the computer-readable instructions, wherein the computer-readable instructions, when executed by the processor, implement the steps of the dynamic hot backup method of the server according to any one of the above.

A non-transitory storage medium stores computer-readable instructions, wherein the computer-readable instructions, when executed by a processor, implement the steps of the dynamic hot backup method of the server according to any one of the above.

The details of one or more embodiments of the present application are presented in the accompanying drawings and description below. Other features and advantages of the present application will become apparent from the specification, accompanying drawings, and claims.

BRIEF DESCRIPTION OF THE DRAWINGS

To describe the technical solutions in the embodiments of the present application or in the related art more clearly, the following briefly introduces the accompanying drawings for describing the embodiments or the related art. Apparently, the accompanying drawings in the following description show merely some embodiments of the present application, and a person of ordinary skill in the art may still derive other drawings from the accompanying drawings without creative efforts.

DETAILED DESCRIPTION

The core of the embodiments of the present application is to provide a dynamic hot backup method, apparatus, and device of a server, and a storage medium, to achieve dynamic hot backup of a PCI link of the server.

The technical solutions in embodiments of the present application are clearly and completely described in the following with reference to the accompanying drawings in the embodiments of the present application. Apparently, the described embodiments are merely some rather than all of the embodiments of the present application. All other embodiments obtained by a person of ordinary skill in the art based on the embodiments of the present application without making creative efforts shall fall within the protection scope of the present application.

Figure 1:
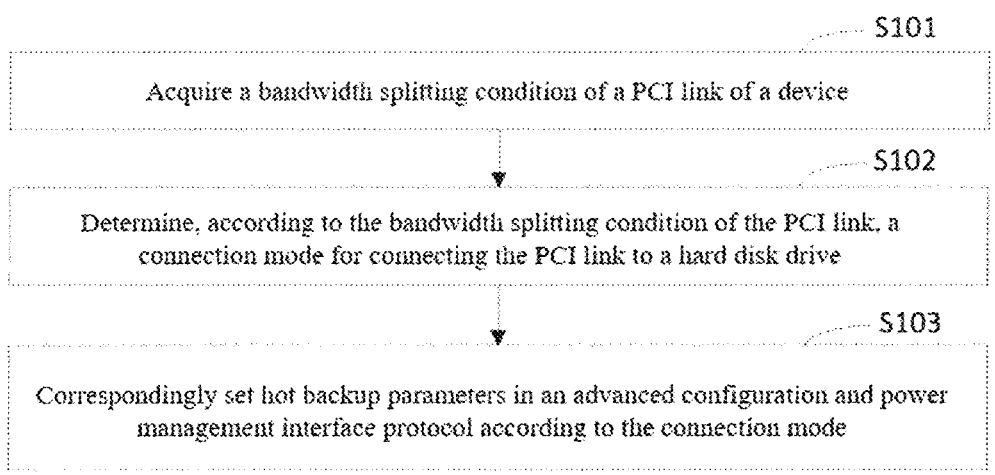
FIG. 1 is a flowchart of a dynamic hot backup method of a server according to one or more embodiments of the present application.
Figure 2:
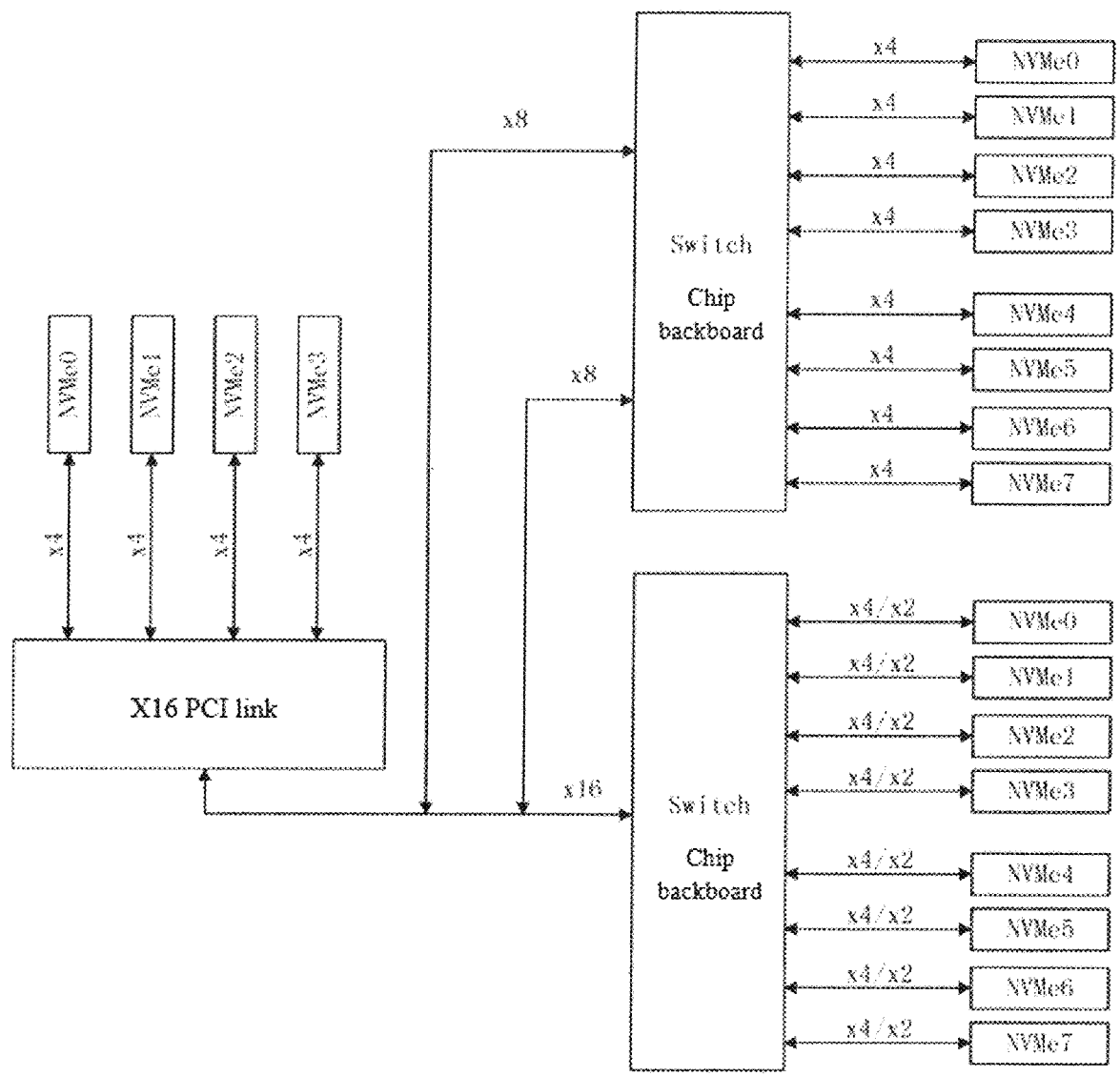
FIG. 2 is a schematic diagram of a connection mode for a PCI link and a hard disk drive according to one or more embodiments of the present application.

FIG. 1 is a flowchart of a dynamic hot backup method of a server according to one or more embodiments of the present application; and FIG. 2 is a schematic diagram of a connection mode for a PCI link and a hard disk drive according to one or more embodiments of the present application.

As shown in FIG. 1, a dynamic hot backup method of a server according to an embodiment of the present application includes:

S101: A bandwidth splitting condition of a PCI link of a device is acquired.

S102: A connection mode for connecting the PCI link to a hard disk drive is determined according to the bandwidth splitting condition of the PCI link.

S103: Hot backup parameters in an advanced configuration and power management interface protocol are correspondingly set according to the connection mode.

In specific implementation, the dynamic hot backup method of the server according to this embodiment of the present application might be applied to a chip where a Basic Input Output System (BIOS) is located, or other chips capable of controlling communication with the BIOS.

In the prior art, the server might not identify a connection mode for an NVMe hard disk drive, so that there is no basis for switching to a corresponding hot backup function. The existing connection modes for the NVMe hard disk drive mainly include two kinds: direct connection between the PCI link and the hard disk drive, and connection between the PCI link and the hard disk drive through a switching device. When the PCI link is directly connected to the hard disk drive, it has four interfaces, and the corresponding bandwidth splitting condition indicates that a bandwidth is divided into four channels (x4). If the switching device (Switch chip) supported in the advanced configuration and power management interface protocol has eight interfaces, the corresponding bandwidth splitting condition indicates that a bandwidth is divided into eight channels (x8). As shown in FIG. 2, a motherboard central processing unit (CPU) of the server supports a maximum of 16-channel (x16) bandwidth and supports splitting the bandwidth into two eight-channel (x8) bandwidths or four four-channel (x4) bandwidths. If a switching device (Switch chip) is used on the motherboard and supports a maximum of 32-channel (x32) bandwidth, the bandwidth might be split into a combination of a 16-channel (x16) bandwidth and an eight-channels (x8) bandwidth, a combination of three eight-channel (x8) bandwidths, or the like. The switching device (Switch chip) might be connected to the NVMe hard disk drive in an x4 or x2 manner. In practical applications, splitting settings might be made according to actual needs. If the PCI link is directly connected to the hard disk drive, there are four four-channel (x4) bandwidths, and eight NVMe hard disk drive backboards have a 16-channel (x16) bandwidth. Therefore, an actual need for hot backup might be determined according to the splitting condition.

In this regard, the dynamic hot backup method of the server provided in this embodiment of the present application adds a logic to an executive body in advance to determine the connection mode for the NVMe hard disk drive, that is, the connection mode for connecting the PCI link to the hard disk drive is determined through the bandwidth splitting condition of the PCI link. Meanwhile, hot backup configurations corresponding to different connection modes for connecting the PCI link to the hard disk drive are set in advanced configuration and power management interface protocol instructions of the BIOS, so that when started up, the device might be dynamically switched to a hot backup function corresponding to a current connection mode.

For step S101, when the device in step S101 is an Advanced RISC Machine (ARM) server, and a Riser card (which is a function expansion card or an adapter card plugged into a PCIe interface) is connected to the PCI link. Step S101 might in some embodiments include: A General-Purpose Input Output (GPIO) state value of the Riser card on the PCI link is read; and the bandwidth splitting condition of the PCI link is determined according to the GPIO state value. The ARM server here refers to a server that adopts an ARM architecture, and the ARM here refers to a Reduced Instruction Set Computer (RISC) microprocessor.

Or, step S101 might also be as follows: The bandwidth splitting condition of the PCI link recorded in a Central Processing Unit (CPU) of the device. If the operation and maintenance staff configure the bandwidth splitting condition of the PCI link in the CPU in advance, the operation and maintenance staff might read the bandwidth splitting condition of the PCI link recorded in the CPU.

For step S102, as mentioned above, there are mainly two kinds of connection modes for connecting the PCI link to the hard disk at present: direct connection between the PCI link and the hard disk, and connection between the PCI link and the hard disk through switching and adapter devices. Therefore, in step S102, a connection mode for connecting the PCI link to a hard disk drive is determined according to the bandwidth splitting condition of the PCI link, which may in some embodiments include: In response to the bandwidth splitting condition of the PCI link indicating that a bandwidth is split into four channels, it is determined that the connection mode is directly connecting the PCI link to the hard disk drive; or in response to the bandwidth splitting condition of the PCI link indicating that a bandwidth is split into eight channels, it is determined that the connection mode is connecting the PCI link to the hard disk drive through a switching device.

It might be understood that as the number of the connection modes supported in the advanced configuration and power management interface protocol increases, corresponding relationships between the bandwidth splitting conditions of the PCI link targeted by the dynamic hot backup method of the server provided in the embodiments of the present application and the connection modes for connecting the PCI link to the hard disk drive might correspondingly increase to achieve dynamic update of more hot backup functions.

For step S103, the advanced configuration and power management interface protocol includes a Differentiated System Description Table (DSDT), which is a table describing different information of a system. A PCI link connection state value is added in the DSDT that represents the connection mode for connecting the PCI link to the hard disk drive in advance, for example, "0" might be used to represent direct connection between the PCI link and the hard disk drive, and "1" might be used to represent that connection between the PCI link and the hard disk drive through a switching device, so that the connection mode for connecting the PCI link to the hard disk drive is transmitted to the advanced configuration and power management interface protocol instructions. This enables the advanced configuration and power management interface protocol instructions to complete the hot backup configuration of the current connection mode for connecting the PCI link to the hard disk drive in an execution process.

In step S103, hot backup parameters are correspondingly set in an advanced configuration and power management interface protocol according to the connection mode, which may in some embodiments include: a PCI link connection state value in a DSDT of the advanced configuration and power management interface protocol is set to a state value corresponding to the connection mode; and an advanced configuration and power management interface protocol instructions are run, and the hot backup parameters in the advanced configuration and power management interface protocol are set to correspond to the PCI link connection state value.

Updating the PCI link connection state value in the DSDT determines variables transmitted by the DSDT according to the specification of the advanced configuration and power management interface protocol, and the corresponding hot backup function is switched to.

For the case where the device in step S101 is the ARM server, the hot backup settings corresponding to the direct connection between the PCI link and the hard disk drive mentioned above might include: Inter-Integrated Circuit (I2C) hot backup and General Purpose Input Output (GPIO) hot backup. In the I2C hot backup mode, an Alter signal is triggered when the NVMe hard disk drive is plugged; and the CPU is notified to recognize the newly plugged hard disk drive and displays it as meeting the use requirement. In the GPIO hot backup mode, the GPIO is pulled up by default to a high level. When the NVMe hard disk drive is plugged, the GPIO will be pulled down, and a command will be triggered to be sent to the CPU. The CPU will recognize the newly plugged hard disk drive and display it as meeting the use requirement. When the direct connection between the PCI link and the hard disk drive is confirmed, the I2C hot backup mode might be used by default.

When it is confirmed that the PCI link is connected to the hard disk drive through the switching device, global variables pre-defined in the DSDT of the ACPI protocol are updated according to configuration information. The ACPI protocol is informed that the NVMe hard disk drive is connected through an eight-interface switching device (Switch chip) at this time, and the ACPI program that directly connects the NVMe hard disk drive is skipped. The ACPI program that supports the eight-interface switching device (Switch chip) is used for execution and supports the NVMe hot swapping function.

After the above steps are completed during the starting of the device, after an operating system (OS) is activated, all PCI links might support the hot backup functions corresponding to the connection modes for connecting the PCI links to the hard disk drives. Different PCI links might be configured with different hot backup functions. Furthermore, after the device is restarted at the next time, other hot backup functions might also be replaced.

The dynamic hot backup method of the server according to this embodiment of the present application includes: acquiring a bandwidth splitting condition of a PCI link of a device; determining a connection mode for connecting the PCI link to a hard disk drive according to the bandwidth splitting condition of the PCI link; and correspondingly setting hot backup parameters in an advanced configuration and power management interface protocol according to the connection mode. Due to the fact that corresponding bandwidth splitting conditions are different when the PCI link is connected to the hard disk drive in different modes, for example, when the PCI link is directly connected to the hard disk drive or connected to the hard disk drive by means of a switching device, the connection modes for connecting the PCI link to the hard disk drive might be determined according to the bandwidth splitting conditions, and the hot backup parameters in the advanced configuration and power management interface protocol are correspondingly set. The problem that the advanced configuration and power management interface protocol does not support dynamic hot backup of the PCI link is solved. Compared to the existing technology where one BIOS mirror image only supports one hot backup function, the dynamic hot backup method of the server according to this embodiment of the present application might support different hot backup functions for different PCI links, so that a user might flexibly select a desired hot backup form, which provides reliability and stability for the safe operations of a server in a data center. It provides a strong guarantee for batch deployment of the server in an Internet data center.

Based on the above embodiments, to accelerate initialization of a hot backup setting progress, in the dynamic hot backup method of the server according to this embodiment of the present application, in step S103, hot backup parameters in an advanced configuration and power management interface protocol are correspondingly according to the connection mode, which in some embodiments includes: Default values of the hot backup parameters in the advanced configuration and power management interface protocol are set in advance to parameter values corresponding to the direct connection mode; and in response to the connection mode being connecting the PCI link to the hard disk drive through the switching device, the hot backup parameters in the advanced configuration and power management interface protocol are changed into parameter values corresponding to the connection mode achieved through the switching device.

Further, in the dynamic hot backup method of the server according to this embodiment of the present application, in step S103, hot backup parameters in an advanced configuration and power management interface protocol are correspondingly according to the connection mode, which further in some embodiments includes: In response to the connection mode being directly connecting the PCI link connected to the hard disk drive, changing the hot backup parameters in the advanced configuration and power management interface protocol is skipped.

In specific implementation, to accelerate initialization of a hot backup setting progress, in addition to setting the hot backup parameters in the advanced configuration and power management interface protocol to default values in advance, the PCI link connection state value in the DSDT might also be set to a default value. The two default values might be values corresponding to the direct connection mode, or might be values corresponding to the connection mode for connecting the PCI link to the hard disk drive through the switching device.

This embodiment of the present application takes the following as an example: setting the value corresponding to the direct connection mode to the default value. In practical applications, this may in some embodiments include the following process:

The BIOS acquires a bandwidth splitting condition of each PCI link of the CPU in a starting process.

In response to the bandwidth splitting condition of the PCI link being x4, it is determined that the connection mode is directly connecting the PCI link to the hard disk drive. The BIOS maintains the default value setting for the parameter variables of the advanced configuration and power management interface protocol. If the device is the ARM server, the hot backup function is performed using the I2C mode or the GPIO mode provided by the above embodiment.

In response to the bandwidth splitting condition of the PCI link being x8, if it is determined that the connection mode is connecting the PCI link to the hard disk drive through the switching device, the BIOS updates the PCI link connection state value in the advanced configuration and power management interface protocol through the DSDT according to the parameter variables of the advanced configuration and power management interface protocol. The latest PCI link connection state value is transmitted to the advanced configuration and power management interface protocol through the updated DSDT.

The advanced configuration and power management interface protocol instructions are run to determine the PCI link connection state value transmitted by the DSDT.

In response to keeping the PCI link connection state value and the default value consistent, the traditional mode for directly connecting the PCI link to the hard disk drive is adopted to support the hot backup function, and the hot backup function that supports connecting the PCI link to the hard disk drive through the switching device is not enabled.

In response to the PCI link connection state value being inconsistent with the default value, update is performed, and the hot backup function in the advanced configuration and power management interface protocol that supports connecting the PCI link to the hard disk drive through the switching device is enabled; and the hot backup function that supports directly connecting the PCI link to the hard disk drive is disabled.

After the device is started and the operating system is activated, the hot backup functions corresponding to the connection modes for the PCI link and the hard disk drive might be supported.

It is understood that although all the steps in the flowchart of FIG. 1 are displayed in sequence according to the instructions of the arrows, these steps are not necessarily performed in sequence according to the sequence indicated by the arrows. Unless otherwise explicitly specified in the present application, execution of the steps is not strictly limited, and the steps may be performed in other sequences. Moreover, at least some of the steps in FIG. 1 may include a plurality of sub steps or a plurality of stages. These sub steps or stages are not necessarily performed at the same moment but may be performed at different moments. Execution of these sub steps or stages is not necessarily performed in sequence, but may be performed in turn or alternately with other steps or sub steps in other steps or at least some of the stages.

The above describes all the embodiments corresponding to the dynamic hot backup method of the server in detail. Based on this, the present application further discloses a dynamic hot backup apparatus and device of a server corresponding to the method described above, and a storage medium.

Figure 3:
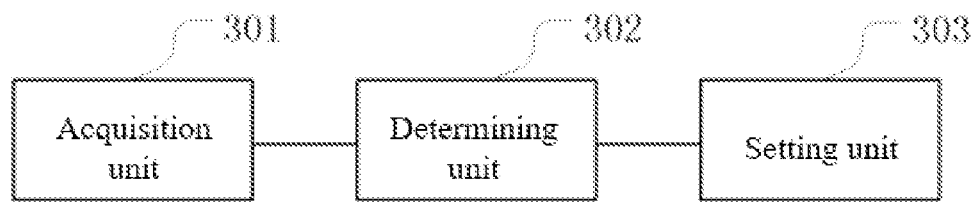
FIG. 3 is a schematic structural diagram of a dynamic hot backup apparatus of a server according to one or more exemplary embodiments of the present application.

In some embodiments, FIG. 3 is a schematic structural diagram of a dynamic hot backup apparatus of a server according to an embodiment of the present application.

As shown in FIG. 3, the dynamic hot backup apparatus of the server according to this embodiment of the present application includes:
- an acquisition unit 301, configured for acquiring a bandwidth splitting condition of a PCI link of a device;
- a determining unit 302, configured for determining, according to the bandwidth splitting condition of the PCI link, a connection mode for connecting the PCI link to a hard disk drive; and
- a setting unit 303, configured for correspondingly setting hot backup parameters in an advanced configuration and power management interface protocol according to the connection mode.

The specific limitations on the dynamic hot backup apparatus of the server might be found in the limitations on the dynamic hot backup method of the server described above, and will not be elaborated here. All the modules in the dynamic hot backup apparatus of the server may be implemented entirely or partially through software, hardware, or a combination thereof. The above modules might be embedded in or independent of a processor in a computer device in a hardware form, or stored in a memory in the computer device in a software form, for the processor to invoke and execute the operations corresponding to the above modules.

Embodiment IV

Figure 4:
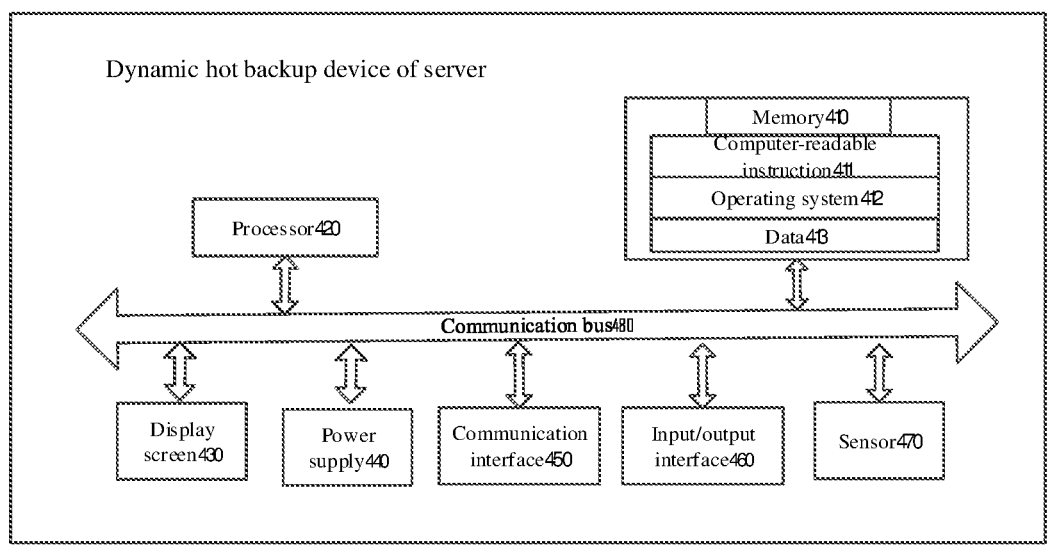
FIG. 4 is a schematic structural diagram of a dynamic hot backup device of a server according to one or more embodiments of the present application.

FIG. 4 is a schematic structural diagram of a dynamic hot backup device of a server according to an embodiment of the present application.

As shown in FIG. 4, the dynamic hot backup device of the server according to this embodiment of the present application includes:
- a memory 410, configured for storing computer-readable instructions 411; and
- a processor 420, configured for executing the computer-readable instructions 411, wherein the computer-readable instructions 411, when executed by the processor 420, implement the steps of the dynamic hot backup method of the server according to any one of the embodiments described above.

The processor 420 may include one or more processing cores, such as a 3-core processor and an 8-core processor. The processor 420 may be implemented in at least one hardware form of a digital signal processor (DSP), a field-programmable gate array (FPGA), and a programmable logic array (PLA). The processor 420 may also include a main processor and a coprocessor. The main processor is a processor configured for processing data in an awake state, and is also referred to as a CPU. The coprocessor is a low-power processor configured for processing data in a standby state. In some embodiments, the processor 420 may be integrated with a graphics processing unit (GPU). The GPU is configured for rendering and drawing content that needs to be displayed on a display screen. In some embodiments, the processor 420 may further include an artificial intelligence (AI) processor. The AI processor is configured for processing computing operations related to machine learning.

The memory 410 may include one or more storage medium. The storage medium may be non-transitory. The memory 410 may also include high-speed random-access memory and a non-volatile memory, such as one or more magnetic storage devices and flash storage devices. In this embodiment, the memory 410 is at least configured for storing the following computer-readable instructions 411, wherein after being loaded and executed by the processor 420, the computer-readable instructions 411 might implement the relevant steps in the dynamic hot backup method of the server disclosed in any one of the aforementioned embodiments. In addition, resources stored in the memory 410 may also include an operating system 412 and data 413, and a storage mode may be temporary storage or permanent storage. The operating system 412 might be Windows. The data 413 may include but not limited to data involved in the method described above.

In some embodiments, the dynamic hot backup device of the server may also include a display screen 430, a power supply 440, a communication interface 450, an input/output interface 460, a sensor 470, and a communication bus 480.

A person skilled in the art may understand that the structures shown in FIG. 4 impose no limitation on the dynamic hot backup device of the server, and may include more or fewer components than those shown in the figure.

The dynamic hot backup device of the server according to this embodiment of the present application includes the memory and the processor. The processor might implement the dynamic hot backup method of the server as described above when executing computer-readable instructions stored in the memory. The effects are the same as above.

Embodiment V

It should be noted that the above-described apparatus and device embodiments are merely illustrative. For example, the division of the modules is only one type of logical functional division, and other divisions are achieved in practice. For another example, multiple modules or components might be combined or integrated into another system, or some features might be omitted, or not executed. In addition, the shown or discussed mutual coupling or direct coupling or communication connection is an indirect coupling or communication connection through some interfaces, apparatuses or modules, and is in an electrical, mechanical or another form. The modules described as separate parts may or may not be physically separate, and parts displayed as modules may or may not be physical modules, may be located in one position, or may be distributed on a plurality of network modules. Some or all of the modules are selected according to actual needs to achieve the objective of the solution of this embodiment.

In addition, functional modules in embodiments of the present application may be integrated into one processing module, or each of the modules may exist alone physically, or two or more modules are integrated into one module. The integrated modules mentioned above might be implemented in both a hardware form and a software functional module form.

When the integrated module is implemented in the form of a software functional module and sold or used as an independent product, the integrated module may be stored in a storage medium. Based on this understanding, the technical solutions of the present application essentially, or the part that contributes to the prior art, or all or some of the technical solutions, might be reflected in the form of a software product. The computer software product is stored in a storage medium to execute all or some of the steps of the methods in the various embodiments of the present application.

Therefore, the embodiments of the present application further provide one or more non-transitory storage medium. The storage medium store computer-readable instructions. The computer-readable instructions, when executed by a processor, implement the steps of the dynamic hot backup method of the server in any one of the embodiments described above.

The storage medium may include: various media that might store program instructions, such as a USB flash drive, a mobile hard disk drive, a Read-Only Memory (ROM), a Random Access Memory (RAM), a magnetic disk, and a compact disc.

The computer-readable instructions stored in the non-transitory storage medium provided in this embodiment might implement the steps of the dynamic hot backup method of the server as described above when executed by the processor. The effects are the same as above.

The above provides a detailed introduction to the dynamic hot backup method, apparatus, and device of the server, and the storage medium. The various embodiments in this specification are described in a progressive manner, and each embodiment focuses on differences from other embodiments. The same and similar parts between all the embodiments might be referred to each other. Since the apparatus, the device, and the storage medium disclosed in the embodiments correspond to the method disclosed in the embodiments, they are described simply, and related parts refer to some of the explanations of the method. It should be pointed out that a person of ordinary skill in the art might also make several improvements and modifications to the present application without departing from the principles of the present application, and these improvements and modifications also fall within the scope of protection of the claims of the present application.

It should be noted that in this specification, relationship terms such as first and second are used only to distinguish one entity or operation from another entity or operation without necessarily requiring or implying any actual such relationship or order between these entities or operations. Furthermore, the terms "includes", "including", or any other variation thereof, are intended to encompass a non-exclusive inclusion, such that a process, method, article, or device that includes a list of elements does not include only those elements but may include other elements not explicitly listed or inherent to such process, method, article, or device. Without further limitation, an element defined by the phrase "including a/an . . . " does not exclude the presence of another identical elements in the process, method, article or device that includes the element.

What is claimed is:

1. A dynamic hot backup method of a server, comprising:
    acquiring a bandwidth splitting condition of a Peripheral Component Interconnect (PCI) link of a device;
    determining, according to the bandwidth splitting condition of the PCI link, a connection mode for connecting the PCI link to a hard disk drive; and
    correspondingly updating hot backup parameters in an advanced configuration and power management interface protocol according to the connection mode;
    wherein the determining, according to the bandwidth splitting condition of the PCI link, a connection mode for connecting the PCI link to a hard disk drive comprises:
        in response to the bandwidth splitting condition of the PCI link indicating that a bandwidth is split into four channels, determining that the connection mode is directly connecting the PCI link to the hard disk drive; and
        in response to the bandwidth splitting condition of the PCI link indicating that the bandwidth is split into eight channels, determining that the connection mode is connecting the PCI link to the hard disk drive through a switching device.

2. The method according to claim 1, wherein the correspondingly updating hot backup parameters in an advanced configuration and power management interface protocol according to the connection mode comprises:
    setting default values of the hot backup parameters in the advanced configuration and power management interface protocol in advance to parameter values corresponding to a direct connection mode; and
    in response to the connection mode being connecting the PCI link to the hard disk drive through the switching device, changing the hot backup parameters in the advanced configuration and power management interface protocol into parameter values corresponding to the connection mode achieved through the switching device.

3. The method according to claim 2, wherein the correspondingly updating hot backup parameters in an advanced configuration and power management interface protocol according to the connection mode further comprises:
in response to the connection mode being directly connecting the PCI link to the hard disk drive, skipping changing the hot backup parameters in the advanced configuration and power management interface protocol.

4. The method according to claim 1, wherein the device is an Advanced RISC Machine (ARM) server, and the acquiring a bandwidth splitting condition of a PCI link of a device comprises:
reading a general-purpose input output state value of a Riser card on the PCI link; and
determining the bandwidth splitting condition of the PCI link according to the general-purpose input output state value.

5. The method according to claim 4, wherein the Riser card comprises a function expansion card or an adapter card plugged on a Peripheral Component Interface Express (PCIe) interface.

6. The method according to claim 1, wherein the acquiring a bandwidth splitting condition of a PCI link of a device comprises:
reading the bandwidth splitting condition of the PCI link recorded in a central processing unit of the device.

7. The method according to claim 1, wherein the correspondingly updating hot backup parameters in an advanced configuration and power management interface protocol according to the connection mode comprises:
updating a PCI link connection state value in a Differentiated System Description Table (DSDT) of the advanced configuration and power management interface protocol to a state value corresponding to the connection mode; and
running advanced configuration and power management interface protocol instructions and updating the hot backup parameters in the advanced configuration and power management interface protocol to correspond to the PCI link connection state value.

8. The method according to claim 1, wherein the hot backup parameters comprise parameters of a hot swapping function of a nonvolatile memory express (Nvme) hard disk drive.

9. The method according to claim 1, wherein the method is applied to a chip where a basic input/output system is located.

10. One or more non-transitory storage medium, storing computer-readable instructions that are executable by a processor, and upon execution by the processor, are configured to cause the processor to:
acquire a bandwidth splitting condition of a Peripheral Component Interconnect (PCI) link of a device;
determine, according to the bandwidth splitting condition of the PCI link, a connection mode for connecting the PCI link to a hard disk drive; and
correspondingly update hot backup parameters in an advanced configuration and power management interface protocol according to the connection mode;
wherein the computer-readable instructions, upon execution by the processor, are configured to cause the processor to:

in response to the bandwidth splitting condition of the PCI link indicating that a bandwidth is split into four channels, determine that the connection mode is directly connecting the PCI link to the hard disk drive; and
in response to the bandwidth splitting condition of the PCI link indicating that the bandwidth is split into eight channels, determine that the connection mode is connecting the PCI link to the hard disk drive through a switching device.

11. The method according to claim 1, further comprising:
in response to the connection mode supported in the advanced configuration and power management interface protocol updating, updating a corresponding relationship between the bandwidth splitting condition of the PCI link and the connection mode for connecting the PCI link to the hard disk drive.

12. The method according to claim 7, further comprising:
switching to a corresponding hot backup function according to updated hot backup parameters.

13. The method according to claim 3, wherein hot backup settings corresponding to the direct connection mode between the PCI link and the hard disk drive comprise:
an Inter-Integrated Circuit (I2C) hot backup or a General-Purpose Input Output (GPIO) hot backup.

14. A dynamic hot backup device of a server, comprising:
a memory, configured for storing computer-readable instructions; and
a processor, configured for executing the computer-readable instructions, wherein when the computer-readable instructions are executed by the processor, the processor is configured for:
acquiring a bandwidth splitting condition of a Peripheral Component Interconnect (PCI) link of a device;
determining, according to the bandwidth splitting condition of the PCI link, a connection mode for connecting the PCI link to a hard disk drive; and
correspondingly updating hot backup parameters in an advanced configuration and power management interface protocol according to the connection mode;
wherein the processor, upon execution of the computer-readable instructions, is further configured for:
in response to the bandwidth splitting condition of the PCI link indicating that a bandwidth is split into four channels, determining that the connection mode is directly connecting the PCI link to the hard disk drive; and
in response to the bandwidth splitting condition of the PCI link indicating that the bandwidth is split into eight channels, determining that the connection mode is connecting the PCI link to the hard disk drive through a switching device.

15. The dynamic hot backup device according to claim 14, wherein the processor, upon execution of the computer-readable instructions, is further configured for:
setting default values of the hot backup parameters in the advanced configuration and power management interface protocol in advance to parameter values corresponding to a direct connection mode; and
in response to the connection mode being connecting the PCI link to the hard disk drive through the switching device, changing the hot backup parameters in the advanced configuration and power management interface protocol into parameter values corresponding to the connection mode achieved through the switching device.

16. The dynamic hot backup device according to claim 15, wherein the processor, upon execution of the computer-readable instructions, is further configured for:

in response to the connection mode being directly connecting the PCI link to the hard disk drive, skipping changing the hot backup parameters in the advanced configuration and power management interface protocol.

17. The dynamic hot backup device according to claim 14, wherein the processor, upon execution of the computer-readable instructions, is further configured for:

reading a general-purpose input output state value of a Riser card on the PCI link; and determining the bandwidth splitting condition of the PCI link according to the general-purpose input output state value.

18. The dynamic hot backup device according to claim 14, wherein the processor, upon execution of the computer-readable instructions, is further configured for:

updating a PCI link connection state value in a Differentiated System Description Table (DSDT) of the advanced configuration and power management interface protocol to a state value corresponding to the connection mode; and running advanced configuration and power management interface protocol instructions and updating the hot backup parameters in the advanced configuration and power management interface protocol to correspond to the PCI link connection state value.

\* \* \* \* \*